US012620136B2

(12) United States Patent
Oh et al.

(10) Patent No.: US 12,620,136 B2
(45) Date of Patent: May 5, 2026

(54) METHOD FOR DECODING IMMERSIVE VIDEO AND METHOD FOR ENCODING IMMERSIVE VIDEO

(71) Applicants:Electronics and Telecommunications Research Institute, Daejeon (KR); IUCF-HYU (Industry-University Cooperation Foundation Hanyang University), Seoul (KR)

(72) Inventors: Kwan Jung Oh, Daejeon (KR); Gwang Soon Lee, Daejeon (KR); Jeong Il Seo, Daejeon (KR); Hong Chang Shin, Daejeon (KR); Jun Young Jeong, Daejeon (KR); Euee Seon Jang, Seoul (KR); Tian Yu Dong, Seoul (KR); Xin Li, Seoul (KR); Jai Young Oh, Seoul (KR)

(73) Assignees: ELECTRONICS AND TELECOMMUNICATIONS RESEARCH INSTITUTE, Daejeon (KR); UCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 494 days.

(21) Appl. No.: 18/096,415

(22) Filed: Jan. 12, 2023

(65) Prior Publication Data

US 2023/0222694 A1     Jul. 13, 2023

(30) Foreign Application Priority Data

Jan. 12, 2022   (KR) ........................ 10-2022-0004848
Jan. 12, 2022   (KR) ........................ 10-2022-0004922
Dec. 16, 2022   (KR) ........................ 10-2022-0177234

(51) Int. Cl.
H04N 13/178 (2018.01)
G06T 7/194 (2017.01)
(Continued)

(52) U.S. Cl.
CPC ................ G06T 9/00 (2013.01); G06T 7/194 (2017.01); G06T 7/60 (2013.01); G06T 2207/20132 (2013.01)

(58) Field of Classification Search
CPC .. G06T 9/00; G06T 7/194; G06T 7/60; G06T 2207/20132
See application file for complete search history.

(56) References Cited

U.S. PATENT DOCUMENTS 8,073,216 B2 * 12/2011 Dawant ..................... G06T 7/33
                                                          382/128
8,146,133 B2 *  3/2012 Moon ................. H04L 67/1085
                                                          726/16
(Continued)

FOREIGN PATENT DOCUMENTS

EP          3970361          3/2022
KR     10-2021-0128355       10/2021

OTHER PUBLICATIONS

Salahieh et al., "Object-Based Applications for Immersive Video Coding", ISO/IEC JTC1/SC29/WG11 MPEG2019/m50949, Oct. 2019, 6 total pages.

*Primary Examiner* — Philip P. Dang
(74) *Attorney, Agent, or Firm* — KILE PARK REED & HOUTTEMAN PLLC

(57) ABSTRACT

A method of processing an immersive video according to the present disclosure includes performing pruning for an input image, generating an atlas based on patches generated by the pruning and generating a cropped atlas by removing a background region of the atlas.

11 Claims, 11 Drawing Sheets

(51) Int. Cl.
    *G06T 7/60*         (2017.01)
    *G06T 9/00*         (2006.01)

(56)           References Cited

U.S. PATENT DOCUMENTS

| | | | |
|---|---|---|---|
| 8,249,323 B2 * | 8/2012 | Kruger | G01R 33/54 |
| | | | 382/128 |
| 8,363,716 B2 * | 1/2013 | Kalva | G06T 5/50 |
| | | | 375/240.1 |
| 11,064,218 B2 * | 7/2021 | Lee | H04N 13/178 |
| 11,140,377 B2 * | 10/2021 | Lee | H04N 13/161 |
| 11,170,508 B2 * | 11/2021 | Avital | A61B 6/501 |
| 11,212,505 B2 * | 12/2021 | Lee | H04N 13/271 |
| 11,294,547 B2 * | 4/2022 | Mori | G06T 19/00 |
| 11,350,074 B2 * | 5/2022 | Shin | H04N 13/156 |
| 11,477,468 B2 * | 10/2022 | Lee | G06N 3/0464 |
| 11,616,938 B2 * | 3/2023 | Shin | H04N 13/178 |
| | | | 348/36 |
| 2014/0146884 A1 * | 5/2014 | Cho | H04N 19/50 |
| | | | 375/240.12 |
| 2020/0413094 A1 * | 12/2020 | Lee | H04N 19/167 |
| 2022/0122217 A1 | 4/2022 | Lee et al. | |
| 2023/0239451 A1 * | 7/2023 | Fleureau | H04N 13/161 |
| | | | 348/43 |

* cited by examiner

| Sequence | entity | uncrop geo Atlas size | crop geo Atlas size | uncrop tex Atlas size | crop tex Atlas size |
|---|---|---|---|---|---|
| Museum | 3 | 1024 × 2176 | 1024 × 336 | 2048 × 4352 | 2048 × 672 |
| | 7 | 1024 × 2176 | 208 × 80 | 2048 × 4352 | 416 × 160 |
| | 10 | 1024 × 2176 | 1000 × 232 | 2048 × 4352 | 2000 × 456 |
| | 20 | 1024 × 2176 | 616 × 128 | 2048 × 4352 | 1232 × 256 |

【FIG. 11】

| Sequence | entity | High-BR BD rete Y-PSNR | Low-BR BD rete Y-PSNR | High-BR BD rete IV-PSNR | Low-BR BD rete IV-PSNR |
|---|---|---|---|---|---|
| Museum | 0 | -0.5% | -0.1% | 0.1% | 0.3% |
| | 1 | -3.6% | -3.6% | -1.4% | -1.7% |
| | 2 | -1.4% | -1.8% | -1.2% | -1.6% |
| | 3 | 9.9% | 8.6% | 4.0% | 2.8% |
| | 4 | -8.8% | -9.8% | -9.2% | -10.5% |
| | 5 | -0.1% | -0.5% | -0.1% | -0.2% |
| | 6 | -7.8% | -7.6% | -7.3% | -8.4% |
| | 7 | -12.8% | -15.5% | -11.1% | -15.1% |
| | 8 | -8.7% | -10.2% | -10.3% | -10.6% |
| | 9 | -5.0% | -7.6% | -6.0% | -8.0% |
| | 10 | 4.9% | -3.1% | 2.7% | -4.8% |
| | 11 | -2.5% | -3.8% | -2.4% | -3.9% |
| | 12 | -6.0% | -2.1 | -6.0% | -2.3% |
| | 13 | -4.0% | -9.4% | -4.0% | -8.1% |
| | 14 | 1.7% | -4.7% | -4.9% | -14.2% |
| | 15 | -4.8% | -5.8% | -6.3% | -8.2% |
| | 16 | -11.4% | -11.8% | -13.1% | -12.4% |
| | 17 | -8.4% | -11.0% | -30.3% | -12.2% |
| | 18 | -8.4% | -10.8% | -8.9% | -11.5% |
| | 19 | -9.1% | -14.7% | -12.1% | -14.8% |
| | 20 | -13.4% | -11.0% | -13.6% | -11.3% |
| | 21 | -31.3% | -51.6% | -11.1% | -13.2% |
| | 22 | -10.3% | -12.3% | -11.4% | -12.1% |
| | 23 | -14.4% | -14.7% | -14.2% | -14.2% |
| | 24 | -13.9% | -16.5% | -9.7% | -0.8% |
| | average | -6.8% | -9.3% | -7.5% | -7.9% |

METHOD FOR DECODING IMMERSIVE VIDEO AND METHOD FOR ENCODING IMMERSIVE VIDEO

FIELD OF INVENTION

The present disclosure relates to a method for encoding/decoding an immersive video which supports motion parallax for a rotation and translation motion.

BACKGROUND OF THE INVENTION

A virtual reality service is evolving in a direction of providing a service in which a sense of immersion and realism are maximized by generating an omnidirectional image in a form of an actual image or CG (Computer Graphics) and playing it on HMD, a smartphone, etc. Currently, it is known that 6 Degrees of Freedom (DoF) should be supported to play a natural and immersive omnidirectional image through HMD. For a 6DoF image, an image which is free in six directions including (1) left and right rotation, (2) top and bottom rotation, (3) left and right movement, (4) top and bottom movement, etc. should be provided through a HMD screen. But, most of the omnidirectional images based on an actual image support only rotary motion. Accordingly, a study on a field such as acquisition, reproduction technology, etc. of a 6DoF omnidirectional image is actively under way.

DISCLOSURE

Technical Problem

The present disclosure is to provide a method of cropping a part of an atlas.

The present disclosure is to provide a new information element related to a cropped atlas.

The technical objects to be achieved by the present disclosure are not limited to the above-described technical objects, and other technical objects which are not described herein will be clearly understood by those skilled in the pertinent art from the following description.

Technical Solution

A method of encoding an immersive video according to the present disclosure includes performing pruning for an input image, generating an atlas based on patches generated by the pruning and generating a cropped atlas by removing a background region of the atlas.

A method of decoding an immersive video according to the present disclosure includes decoding an atlas and an object map from a bitstream and synthesizing a view image for a predetermined object based on the atlas and the object map. In this case, the atlas may be a cropped atlas that a background region is removed.

Technical Effects

According to the present disclosure, encoding/decoding efficiency may be improved by encoding/decoding a cropped atlas instead of an atlas.

According to the present disclosure, encoding/decoding efficiency may be improved by providing an information element related to a cropped atlas.

Effects achievable by the present disclosure are not limited to the above-described effects, and other effects which are not described herein may be clearly understood by those skilled in the pertinent art from the following description.

BRIEF DESCRIPTION OF DRAWINGS

FIGS. 10 and 11 compare a performance change before and after a method of generating a cropped atlas proposed in the present disclosure is applied for a predetermined test sequence.

DETAILED EMBODIMENTS

Figure 1:
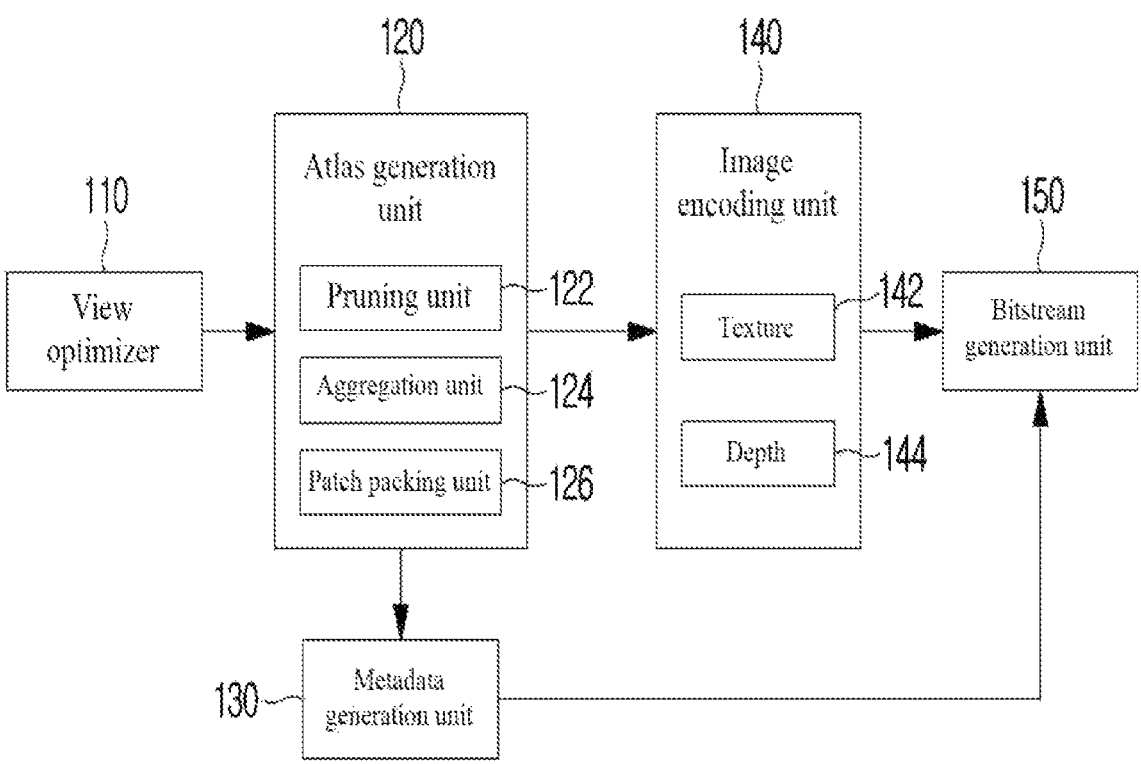
FIG. 1 is a block diagram of an immersive video processing device according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's watching position is changed, refers to an image that a viewport may be also dynamically changed. In order to implement an immersive video, a plurality of input images are required. Each of a plurality of input images may be referred to as a source image or a view image. A different view index may be assigned to each view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an image encoding unit 140 and a bitstream generation unit 150.

An immersive video processing device receives a plurality of pairs of images, a camera internal variable and a camera external variable as an input value to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera internal variable includes a focal distance, a position of a principal point, etc. and a camera external variable includes a position, a direction, etc. of a camera. A camera internal variable and a camera external variable may be treated as a camera parameter or a view parameter.

A view optimizer 110 partitions view images into a plurality of groups. As view images are partitioned into a plurality of groups, independent encoding processing per each group may be performed. In an example, view images filmed by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on a camera parameter. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image filmed by a camera with a highest priority, a view image filmed by a camera with a lowest priority, a view image filmed by a camera at a predefined position (e.g., a central position) or a view image filmed by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a square image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry scale enabled flag, a syntax representing whether it is allowed to reduce a depth atlas, may be encoded/decoded. When a value of a syntax geometry scale enabled flag is 0, it represents that it is not allowed to reduce a depth atlas. In this case, a depth atlas has the same size as a texture atlas.

When a value of a syntax geometry scale enabled flag is 1, it represents that it is allowed to reduce a depth atlas. In this case, information for determining a reduction ratio of a depth atlas may be additionally encoded/decoded. In an example, geometry scaling factor x, a syntax representing a horizontal directional reduction ratio of a depth atlas, and geometry scaling factor y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

Figure 2:
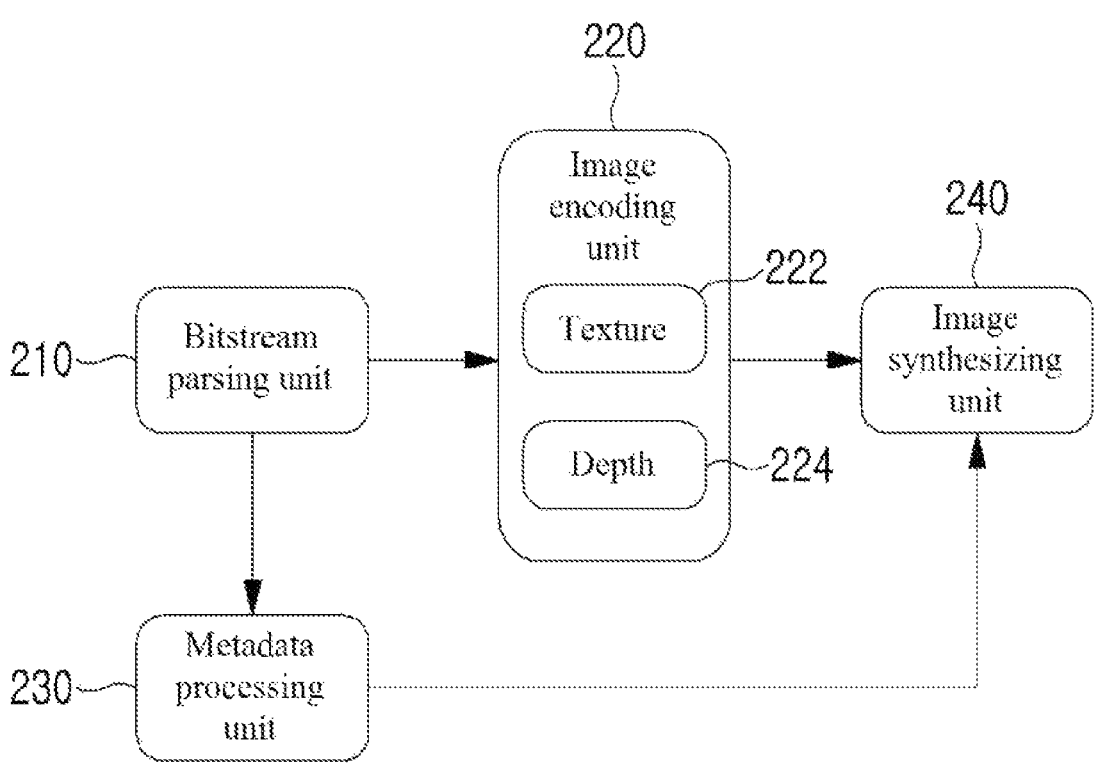
FIG. 2 is a block diagram of an immersive video output device according to an embodiment of the present disclosure.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

Figure 3:
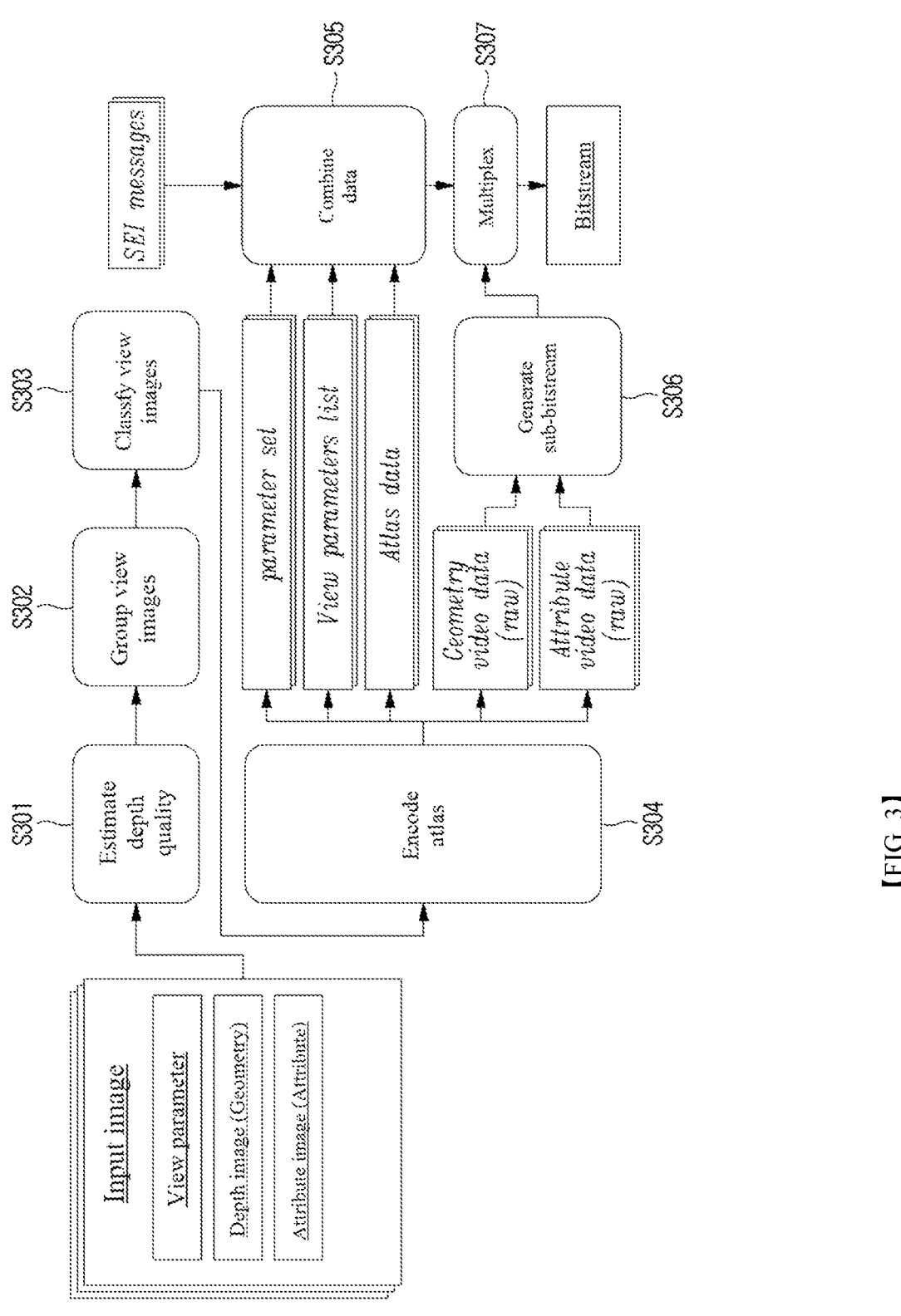
FIG. 3 is a flow chart of an immersive video processing method.
Figure 5:
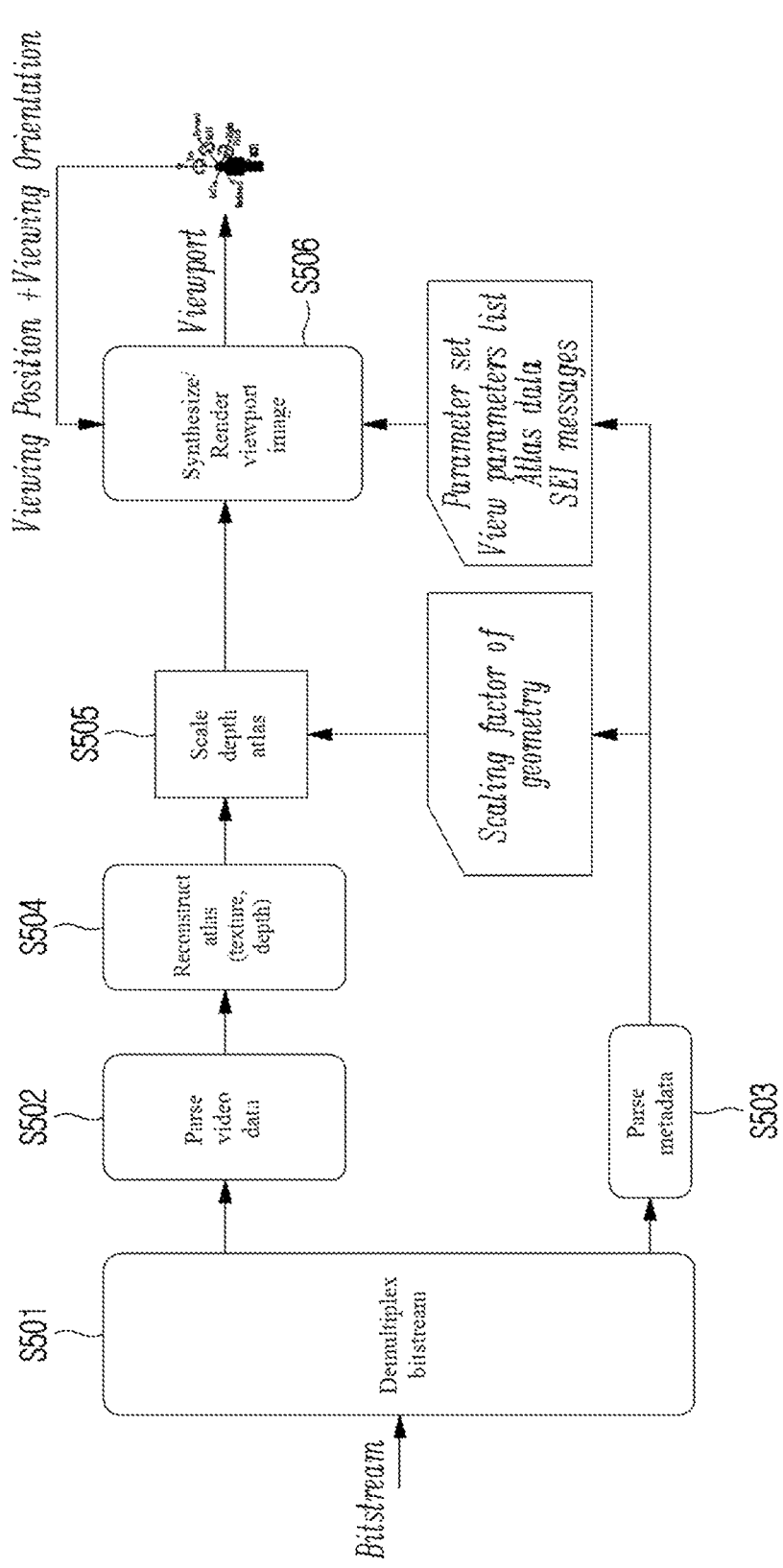
FIG. 5 is a flow chart of an immersive video output method.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be set.

Figure 4:
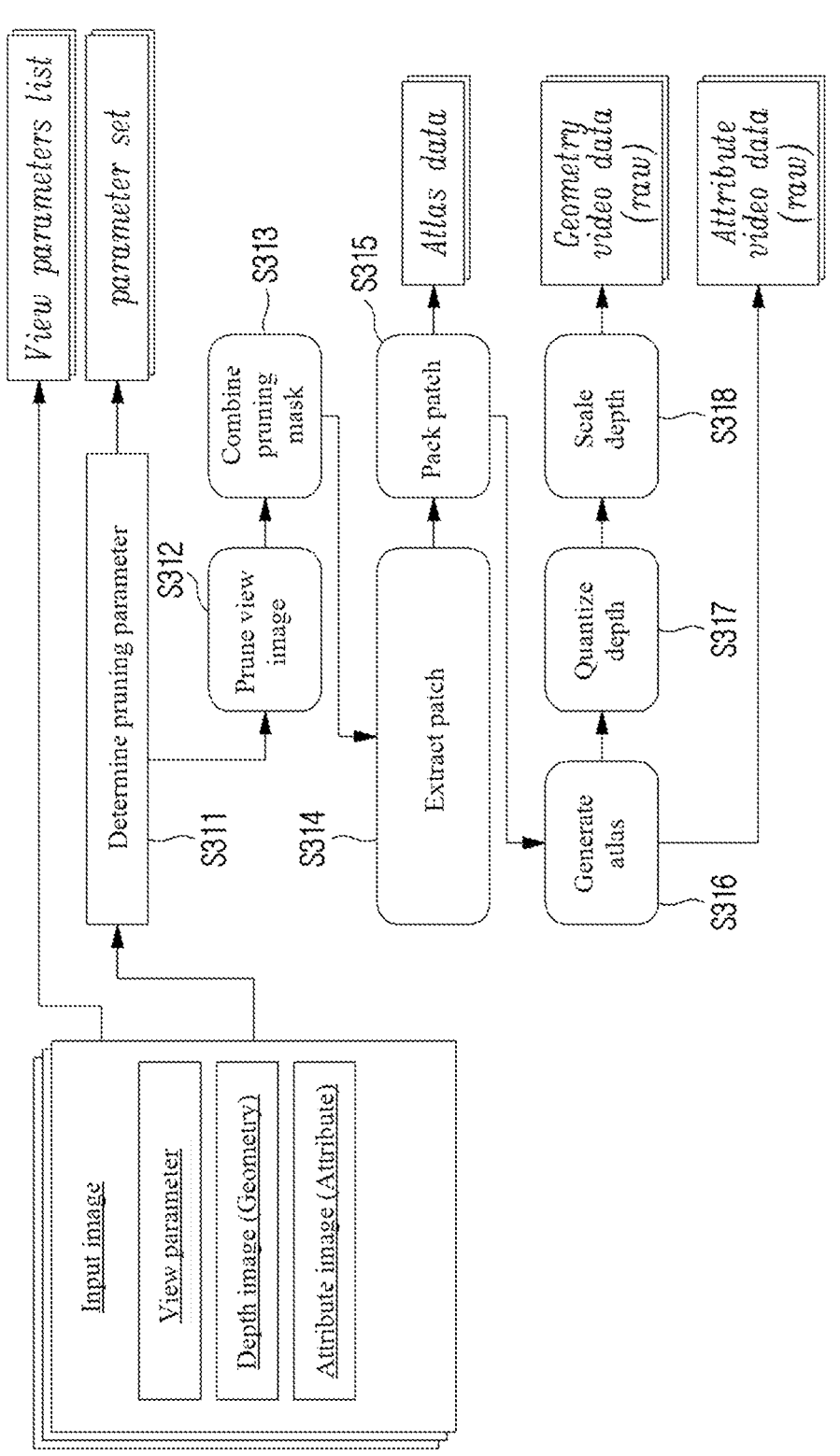
FIG. 4 is a flow chart of an atlas encoding process.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an unpruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize generated patches, size/position information of each patch and a camera parameter, etc. may be used.

Each of elements constituting an input image may be classified as an entity. In an example, each of objects included in an input image may assign a different entity identifier (Entity Identified). Here, an object may represent an object or a person, etc. included in an input image. Alternatively, when an input image is configured with a plurality of layers, a different entity identifier may be assigned to each layer. Alternatively, after partitioning an input image into a plurality of regions, a different entity identifier may be assigned to each of a plurality of regions. Entity setting may be selectively performed according to a user's need.

An encoder/a decoder according to the present disclosure may support object-based image encoding/decoding. Object-based encoding indicates that an encoder selects an object in an input image based on an object map and partially encodes a selected object.

Each of entities that a different entity identifier is assigned to an input image may be treated as one object. Accordingly, object-based image encoding/decoding may be referred to as entity-based image encoding/decoding.

An object map may be a binary image which represents a space occupied by a specific object in an input image. In an example, a value of a pixel corresponding to a region occupied by a specific object in an input image may be set as 1 and a value of a pixel corresponding to a region unoccupied by a specific object may be set as 0.

When object-based coding is supported, each of objects may be independently encoded/decoded. In other words, each of objects may be generated in a separate bitstream.

In order to independently encode/decode each object, each object may be set to configure a different atlas. In an example, only patches derived from one object may be packed into one atlas. In other words, patches to which a different entity identifier (Entity ID) is allocated may not be packed into one atlas. Accordingly, when there are a plurality of atlases, patches packed into each atlas may be derived from a different object.

Figure 6:
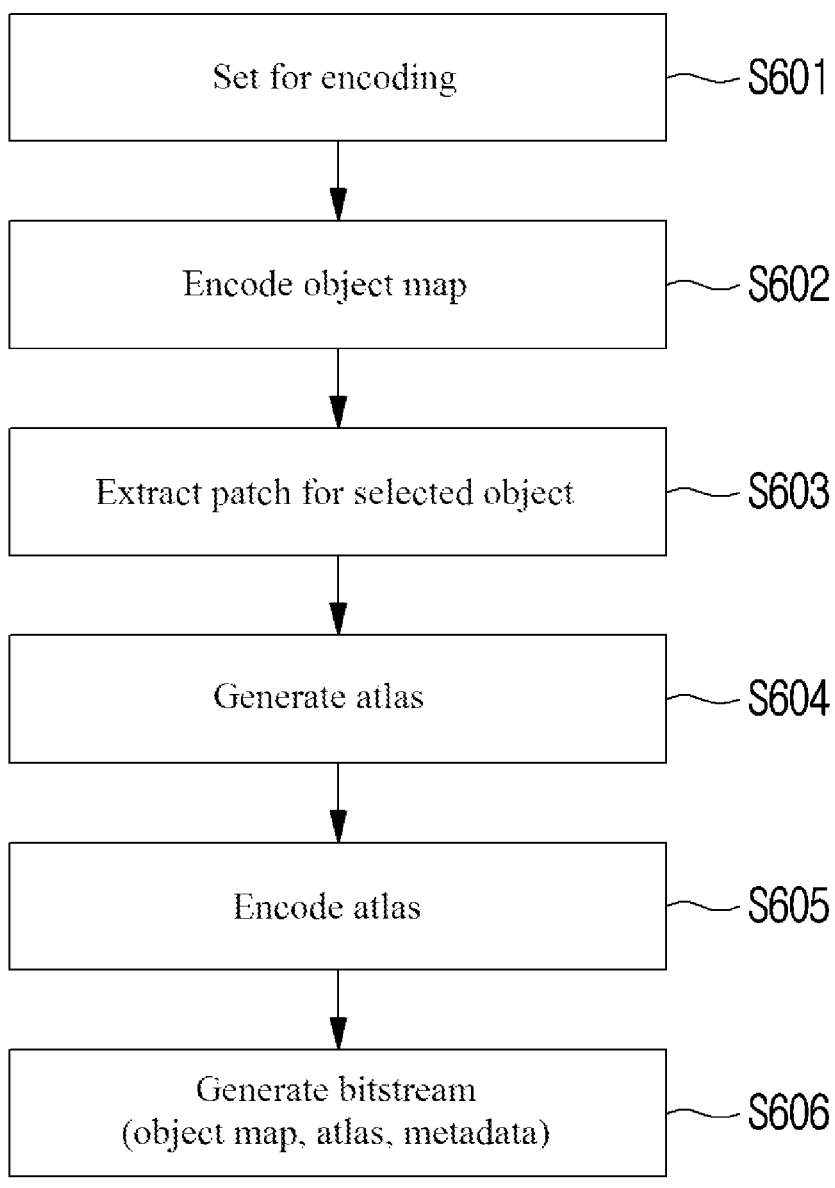
FIG. 6 is a flow chart of an immersive video processing method supporting object-based coding.

FIG. 6 is a flow chart of an immersive video processing method supporting object-based coding.

Specifically, when a different entity identifier is allocated to each of objects included in an immersive video, it represents an example of selecting and encoding at least one of a plurality of objects.

In an encoding setting step, the number and/or a scope of objects to be encoded independently may be set S601. In an example, through a variable EntityEncodeRange, at least one object to be encoded independently among a plurality of objects may be selected.

When an object to be encoded independently is selected, an object map which represents a region occupied by a selected object in input images may be generated and a generated object map may be encoded S602.

When a region occupied by an object in each input image is determined through an object map, pruning may be performed for a plurality of input images to extract patches for a selected object S603.

Subsequently, an atlas may be generated by packing an extracted patch S604 and a generated atlas may be encoded S605. In this case, it may be set to generate an independent atlas per object.

Subsequently, a bitstream may be generated by multiplexing an encoded object map, an encoded atlas and metadata S605.

Metadata may include size information of an atlas. Specifically, width information and height information of an atlas may be encoded. Atlas size information may be encoded for a texture and depth atlas, respectively.

Alternatively, for a texture atlas, atlas size information may be encoded and for a depth atlas, information representing whether to have the same size as a texture atlas may be encoded. When a size of a depth atlas is different from that of a texture atlas, information related to a scaling factor of a depth atlas may be additionally encoded.

Size information of an atlas may be encoded/decoded through a video parameter (e.g., a video parameter set (vps)) or a sequence parameter (e.g., an atlas sequence parameter set (asps)).

Information representing whether object-based coding is applied may be encoded as metadata. In an example, a 1-bit flag indicating whether object-based coding is applied may be encoded/decoded.

When object-based coding is applied, information identifying an independently encoded object may be additionally encoded/decoded. In an example, information identifying an object selected by a variable EntityEncodeRange may be encoded.

When object-based coding is applied, each object may be generated as an independent bitstream. Accordingly, in an immersive video synthesizer, decoding and rendering may be performed by receiving only some bitstreams corresponding to an object to be rendered among a plurality of bitstreams.

Figure 7:
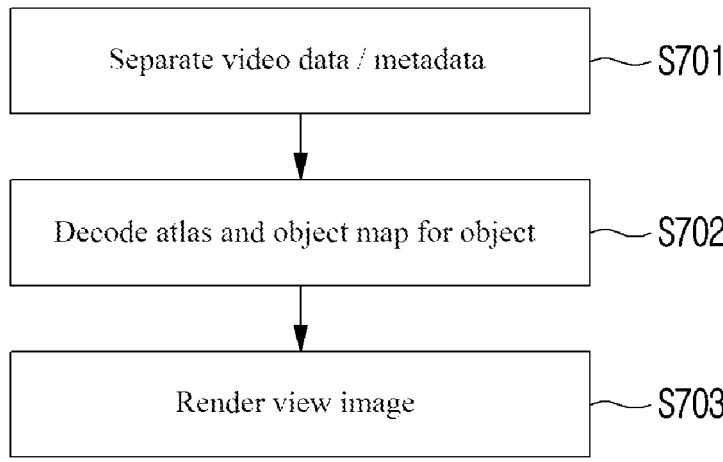
FIG. 7 is a flow chart of an immersive video synthesis method supporting object-based coding.

FIG. 7 is a flow chart of an immersive video synthesis method supporting object-based coding.

When a bitstream is received, an immersive video synthesizer may separate video data and metadata from a bitstream S701.

When rendering for a specific object of an immersive video is requested by a user, an object map and an atlas including data for a corresponding object may be decoded from metadata S702.

Subsequently, through an object map, a rendering position of an object may be determined and a view image for an object requested by a user may be rendered by using a reconstructed atlas S703.

Specifically, patches necessary for image rendering may be extracted from a reconstructed atlas and extracted patches may be arranged in a 3D space to generate a view image.

When object-based coding is applied, only a part occupied by an object selected in a 3D space may be reconstructed and rendered.

Generally, a size of an atlas may be adaptively determined per frame or per group according to a resolution of a view image or a video profile, etc. But, when object-based coding is applied, a case may occur in which a ratio occupied by a region occupied by a patch in an atlas is significantly lower than an actual size of an atlas. In particular, when an atlas is generated based on a non-background object that an occupied space in an image is not large, a problem may occur in which a region which is not occupied by a patch in an atlas becomes excessively large.

In order to resolve the problem, the present disclosure proposes a method of cropping a region which is not used in an atlas. According to the method, a size of an atlas may be reduced to a patch-occupied area.

Figure 8:
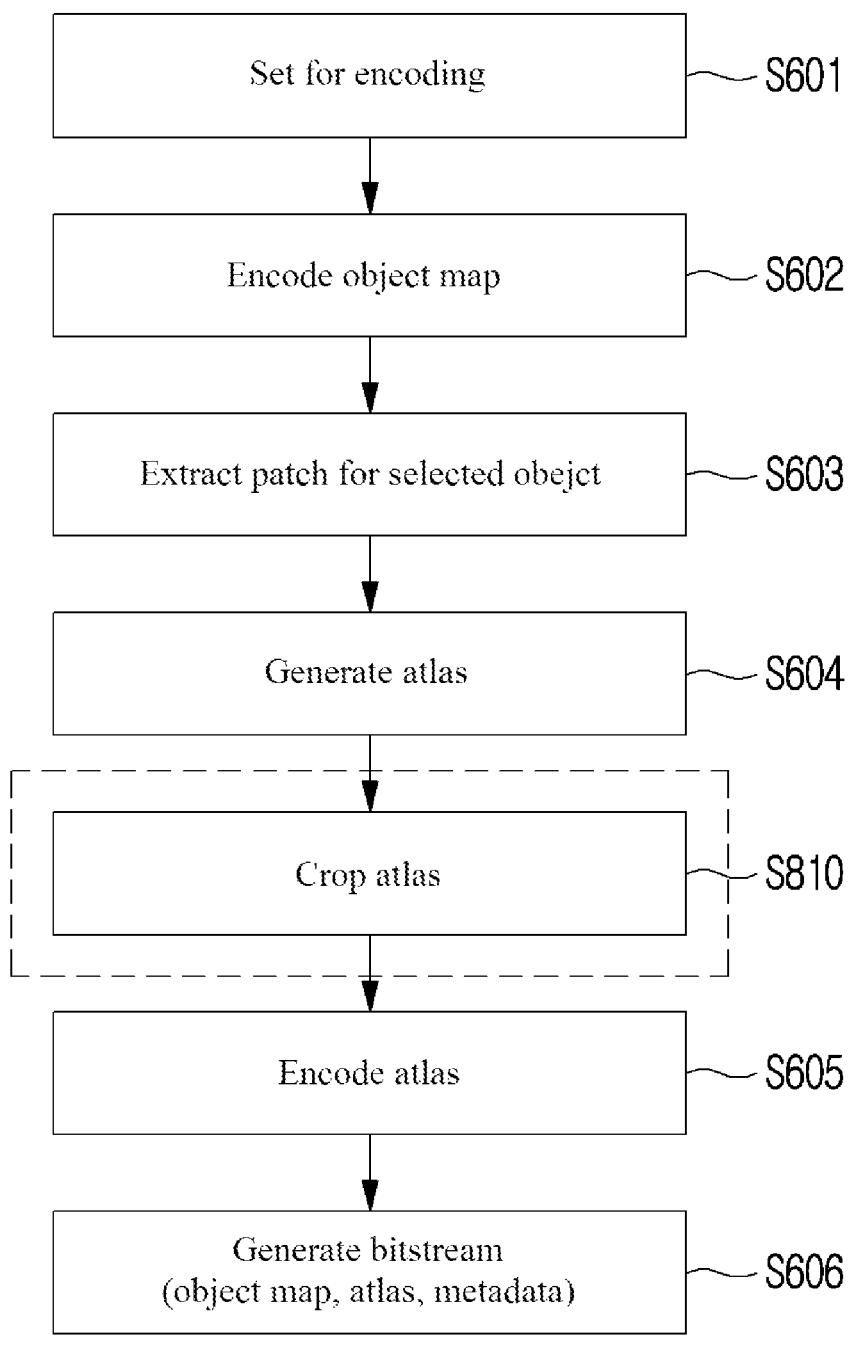
FIG. 8 is a flow chart of an immersive video processing method in which a function of cropping a part of an atlas is added to an immersive video processing method in FIG. 6.

FIG. 8 is a flow chart of an immersive video processing method in which a function of cropping a part of an atlas is added to an immersive video processing method in FIG. 6.

Patches may be generated through a pruning process and generated patches may be packed into an atlas. In this case, when object-based coding is applied, patches extracted from one object may configure one atlas.

A patch-packed atlas may be divided into a valid region and an invalid region. A valid region represents a region which is occupied by a patch and an invalid region represents a region which is not occupied by a patch. A valid region may be used for rendering a specific view image, but an invalid region is not used when rendering a specific view image.

Data in an atlas may be divided into a data region and a background region. A data region may be a square region including a region occupied by patches in an atlas. In an example, a data region may be defined as a square region in the smallest size including all patches packed into an atlas or a square region extended by an offset size from a boundary of a square in the smallest size. Meanwhile, according to a packing state of patches, an invalid region between patches may be also included in a data region.

Alternatively, a data region may be also set based on a patch at a top-left position and a patch at a bottom-right position in an atlas. In an example, a bounding box adjoining a left boundary and a top boundary of a top-left patch and adjoining a right boundary and a bottom boundary of a bottom-right patch may be set as a data region.

Alternatively, a data region may be set based on pixels at a leftmost, topmost, rightmost and bottommost position in an atlas. In an example, a bounding box whose four sides adjoin a leftmost pixel, a rightmost pixel, a topmost pixel and a bottommost pixel respectively may be set as a data region.

A background region represents remaining regions excluding a data region. A background region may be configured with a region which is not occupied by a patch, i.e., only with a region which is not used in image rendering.

A background region and a data region may be divided in a unit of a block, a tile, a slice or a sub-picture. For example, a boundary of a background region and a data region may be set to match a boundary of a block, a tile, a slice or a sub-picture.

When it is determined to crop at least some regions of an atlas, a cropped atlas may be generated by removing a background region of an atlas S810.

Figure 9:
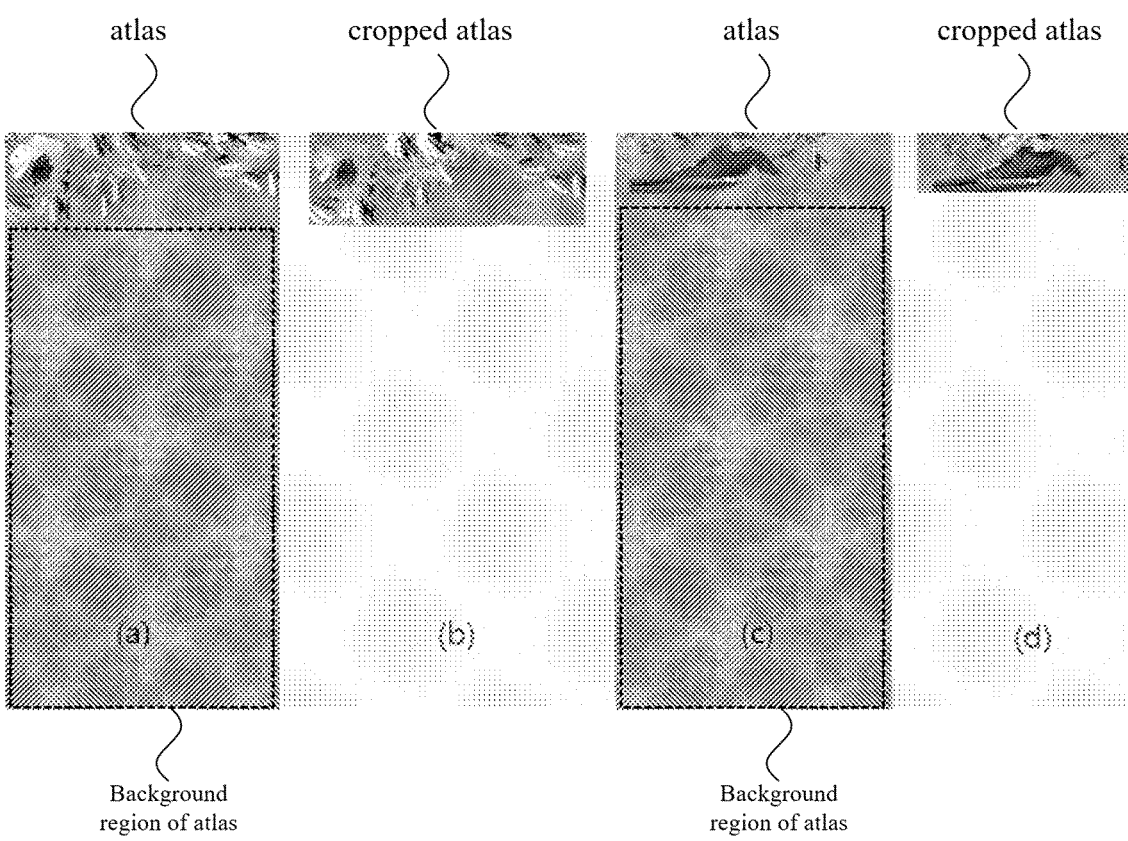
FIG. 9 represents an example in which a cropped atlas is generated.

FIG. 9 represents an example in which a cropped atlas is generated.

Drawing (a) and (c) of FIG. 9 represent an atlas before cropping and drawing (b) and (d) represent a cropped atlas generated by removing a background region from an atlas before cropping in (a) and (c), respectively.

Removing a background region in an atlas may be performed for each of a texture atlas and a depth atlas.

When a cropped atlas is generated, a cropped atlas may be encoded. In other words, instead of an atlas in an original size (i.e., an atlas before cropping), a cropped atlas may be used as an input image for video compression. A background region in an atlas may be removed to improve encoding/decoding efficiency and reduce encoding/decoding complexity.

When object-based coding is applied, removing a background region in an atlas may be set as default. Alternatively, whether to remove a background region in an atlas may be determined based on at least one of a size of an atlas, a ratio occupied by a background region in an atlas, a size of a background region, whether patches included in an atlas are derived from a major object or whether a patch derived from a non-background object in an atlas is included.

For example, when an atlas is generated based on patches derived from a background object like a ground or a ceiling, a size of a background region in an atlas appears relatively small. As such, when a size of a background region in an atlas is small, a coding gain may not be large although a part of an atlas is cropped. Accordingly, when an atlas is configured with patches derived from a background object or when a ratio occupied by a background region in an atlas is smaller than a threshold value, a process of generating a cropped atlas may be omitted.

A position of each patch in an atlas may be determined based on a top-left position of an atlas. For example, a horizontal difference between a top-left position of an atlas and a top-left position of a patch may be set as a x-coordinate of a patch and a vertical difference may be set as a y-coordinate of a patch.

When it is assumed that a top-left position of an atlas is the same as that of a cropped atlas, a position of patches is not changed although a cropped atlas is generated. Accordingly, in an immersive video synthesizer, a patch necessary for rendering may be extracted from a cropped atlas through the same method as a case in which an atlas before cropping is encoded/decoded (e.g., a flow chart in FIG. 7).

But, as described above, when atlas size information is signaled, a case occurs in which a size indicated by atlas size information is different from a size of an atlas to be actually encoded/decoded (i.e., a cropped atlas). In order to prevent such a problem, information on a cropped atlas may be additionally encoded/decoded as metadata.

Table 1 represents a table which includes information elements related to a cropped atlas proposed in the present disclosure and Table 2 represents definition of each information element.

TABLE 1

|  | Descriptor |
| --- | --- |
| atlas_cropping_flag | u(l) |
| if (atlas_cropping_flag) { | |
| cropped_atlas_pos_x | ue(v) |
| cropped_atlas_pos_y | ue(v) |
| cropped_atlas_size_x_minus1 | ue(v) |
| cropped_atlas_size_y_minus1} | ue(v) |

TABLE 2 atlas_cropping_flag equal to 1 indicates that atlas cropping is used.
atlas_cropping_flag equal to 0 indicates that atlas cropping is not used.
cropped_atlas_pos_x specifies the x-coordinate of the top-left corner of the cropped atlas bounding box.
cropped_atlas_pos_y specifies the y-coordinate of the top-left corner of the cropped atlas bounding box.
cropped_atlas_size_x_minus1 plus 1 specifies the width value of the cropped atlas.
cropped_atlas_size_y_minus1 plus 1 specifies the height value of the cropped atlas.

Information related to a cropped atlas may include at least one of information representing whether a cropped atlas is generated, position information of a cropped atlas or size information of a cropped atlas.

Information representing whether a cropped atlas is generated may be a 1-bit flag. In an example, when a syntax atlas_cropping_flag is 0, it represents that a background region in an atlas is not removed. In this case, an atlas in an original size may be encoded/decoded as it is. When a syntax atlas_cropping_flag is 1, it represents that a background region in an atlas is removed. In this case, a cropped atlas instead of an atlas in an original size may be encoded/decoded.

Position information of a cropped atlas indicates a position corresponding to a cropped atlas in an atlas in an original size.

In an example, position information of a cropped atlas may include horizontal position information representing a corresponding position of a left boundary of a cropped atlas in an atlas or vertical position information representing a corresponding position of a top boundary of a cropped atlas in an atlas.

In an example, a syntax cropped_atlas_pos_x represents a left boundary position of a cropped atlas in an atlas in an original size. A syntax cropped_atlas_pos_y represents a top boundary position of a cropped atlas in an atlas in an original size.

In another example, horizontal position information may be defined to indicate a position corresponding to a right boundary of an atlas and vertical position information may be defined to indicate a position corresponding to a bottom boundary of an atlas.

In another example, when a top-left position of an atlas in an original size is the same as that of a cropped atlas, position information encoding/decoding of a cropped atlas may be omitted.

When top-left position information of a cropped atlas is encoded/decoded, a bottom-right position of a cropped atlas may be derived based on the top-left position information and size information of a cropped atlas which will be described below.

Size information of a cropped atlas may include width information of a cropped atlas or height information of a cropped atlas. In an example, a syntax cropped_atlas_size_x_minus1 may represent a value obtained by subtracting 1 from a width of a cropped atlas. A syntax cropped_atlas_size_y_minus1 may represent a value obtained by subtracting 1 from a height of a cropped atlas.

When a data region and a background region are divided in a unit of a block, a tile, a slice or a sub-picture, a syntax cropped_atlas_size_x_minus1 may represent a value obtained by subtracting 1 from the number of block columns, tile columns, slice columns and sub-picture columns included in a cropped atlas. A syntax cropped_atlas_size_y_minus1 may represent a value obtained by subtracting 1 from the number of block rows, tile rows, slice rows and sub-picture rows included in a cropped atlas.

Alternatively, instead of information representing a width of a cropped atlas, information representing a difference value between a width of an atlas in an original size and a width of a cropped atlas may be encoded/decoded. Likewise, instead of information representing a height of a cropped atlas, information representing a difference value between a height of an atlas in an original size and a height of a cropped atlas may be encoded/decoded.

Alternatively, a flag representing whether a width of a cropped atlas is the same as that of an atlas in an original size may be encoded/decoded. Width information of a cropped atlas or information representing a width difference between an atlas in an original size and a cropped atlas may be encoded/decoded only when the flag indicates that a width of a cropped atlas is not the same as that of an atlas in an original size.

When information representing whether a cropped atlas is generated, e.g., encoding/decoding of a syntax atlas_cropping_flag, is omitted and a specific condition is satisfied, it may be determined that a cropped atlas is generated as default. Here, a specific condition may be set based on at least one of whether object-based coding is applied or whether an atlas includes a patch derived from a specific object.

As described above, a position of patches in a cropped atlas is not changed, so a specific view image may be synthesized even without reconstructing a cropped atlas to an original size (i.e., a size before cropping).

In another example, after reconstructing a cropped atlas to an original size (i.e., a size before cropping), a reconstructed atlas may be used to synthesize a specific view image. Specifically, after reconstructing a cropped atlas to a size of an atlas before cropping, patches necessary for rendering a specific view image may be extracted from a reconstructed atlas based on metadata.

When a cropped atlas is extended to an atlas in an original size, pixels belonging to an extended region (i.e., a background region of an atlas before cropping) may be set as a pre-defined value. Here, a pre-defined value may mean the minimum value, a middle value or the maximum value among values which may be expressed by a bit depth.

Alternatively, in reference to samples positioned at a cropped atlas boundary, a value of an extended region may be also set. In an example, a pixel value of an extended region may be extracted by copying a pixel positioned at a boundary of a cropped atlas or interpolating pixels positioned at a boundary of a cropped atlas.

In another example, when a top-left position of an atlas in an original size is different from a top-left position of a cropped atlas, a process of reconstructing a cropped atlas to an atlas in an original size may be necessarily accompanied.

FIGS. 10 and 11 compare a performance change before and after a method of generating a cropped atlas proposed in the present disclosure is applied for a predetermined test sequence.

In FIGS. 10 and 11, a 'museum' defined in MPEG TMIV was used as a test sequence.

As in an example shown in FIG. 10, a cropped atlas reduced in size from an original size may be generated through atlas cropping.

As in an example shown in FIG. 11, when object-based coding is applied, it may be seen in most objects that using a cropped atlas improves coding efficiency compared with using an atlas in an original size.

In an embodiment of FIG. 8, it was described that a cropped atlas is generated by cropping a background region excluding a data region after generating an atlas. In another example, an atlas cropping step S810 shown in FIG. 8 may be omitted and in an atlas generation step, a size of an atlas may be set to be the same as a size of a data region.

In this case, information on an atlas in an original size and information on an atlas in an extended size may be encoded/decoded as metadata. In this embodiment, information on an atlas in an original size may correspond to information on a cropped atlas in an embodiment of FIG. 8 and information on an atlas in an extended size may correspond to information on an atlas in an original size in an embodiment of FIG. 8. In an example, while information on an atlas in an original size represents an information element illustrated in Table 1 and Table 2, information on an atlas in an extended size may correspond to atlas size information encoded/decoded through a video parameter or a sequence parameter.

In a decoder, after decoding an atlas, a decoded atlas may be extended to a size indicated by information on an atlas in an extended size.

A name of syntax elements introduced in the above-described embodiments is just temporarily given to describe embodiments according to the present disclosure. Syntax elements may be named differently from what was proposed in the present disclosure.

A component described in illustrative embodiments of the present disclosure may be implemented by a hardware element. For example, the hardware element may include at least one of a digital signal processor (DSP), a processor, a controller, an application-specific integrated circuit (ASIC), a programmable logic element such as a FPGA, a GPU, other electronic device, or a combination thereof. At least some of functions or processes described in illustrative embodiments of the present disclosure may be implemented by a software and a software may be recorded in a recording medium. A component, a function and a process described in illustrative embodiments may be implemented by a combination of a hardware and a software.

A method according to an embodiment of the present disclosure may be implemented by a program which may be performed by a computer and the computer program may be recorded in a variety of recording media such as a magnetic Storage medium, an optical readout medium, a digital storage medium, etc.

A variety of technologies described in the present disclosure may be implemented by a digital electronic circuit, a computer hardware, a firmware, a software or a combination thereof. The technologies may be implemented by a computer program product, i.e., a computer program tangibly implemented on an information medium or a computer program processed by a computer program (e.g., a machine readable storage device (e.g.: a computer readable medium) or a data processing device) or a data processing device or implemented by a signal propagated to operate a data processing device (e.g., a programmable processor, a computer or a plurality of computers).

Computer program(s) may be written in any form of a programming language including a compiled language or an interpreted language and may be distributed in any form including a stand-alone program or module, a component, a subroutine, or other unit suitable for use in a computing environment. A computer program may be performed by one computer or a plurality of computers which are spread in one site or multiple sites and are interconnected by a communication network.

An example of a processor suitable for executing a computer program includes a general-purpose and special-purpose microprocessor and one or more processors of a digital computer. Generally, a processor receives an instruction and data in a read-only memory or a random access memory or both of them. A component of a computer may include at least one processor for executing an instruction and at least one memory device for storing an instruction and data. In addition, a computer may include one or more mass storage devices for storing data, e.g., a magnetic disk, a magnet-optical disk or an optical disk, or may be connected to the mass storage device to receive and/or transmit data. An example of an information medium suitable for implementing a computer program instruction and data includes a semiconductor memory device (e.g., a magnetic medium such as a hard disk, a floppy disk and a magnetic tape), an optical medium such as a compact disk read-only memory (CD-ROM), a digital video disk (DVD), etc., a magnet-optical medium such as a floptical disk, and a ROM (Read Only Memory), a RAM (Random Access Memory), a flash memory, an EPROM (Erasable Programmable ROM), an EEPROM (Electrically Erasable Programmable ROM) and other known computer readable medium. A processor and a memory may be complemented or integrated by a special-purpose logic circuit.

A processor may execute an operating system (OS) and one or more software applications executed in an OS. A processor device may also respond to software execution to access, store, manipulate, process and generate data. For simplicity, a processor device is described in the singular, but those skilled in the art may understand that a processor device may include a plurality of processing elements and/or various types of processing elements. For example, a processor device may include a plurality of processors or a processor and a controller. In addition, it may configure a different processing structure like parallel processors. In addition, a computer readable medium means all media which may be accessed by a computer and may include both a computer storage medium and a transmission medium.

The present disclosure includes detailed description of various detailed implementation examples, but it should be understood that those details do not limit a scope of claims or an invention proposed in the present disclosure and they describe features of a specific illustrative embodiment.

Features which are individually described in illustrative embodiments of the present disclosure may be implemented by a single illustrative embodiment. Conversely, a variety of features described regarding a single illustrative embodiment in the present disclosure may be implemented by a combination or a proper sub-combination of a plurality of illustrative embodiments. Further, in the present disclosure, the features may be operated by a specific combination and may be described as the combination is initially claimed, but in some cases, one or more features may be excluded from a claimed combination or a claimed combination may be changed in a form of a sub-combination or a modified sub-combination.

Likewise, although an operation is described in specific order in a drawing, it should not be understood that it is necessary to execute operations in specific turn or order or it is necessary to perform all operations in order to achieve a desired result. In a specific case, multitasking and parallel processing may be useful. In addition, it should not be understood that a variety of device components should be separated in illustrative embodiments of all embodiments and the above-described program component and device may be packaged into a single software product or multiple software products.

Illustrative embodiments disclosed herein are just illustrative and do not limit a scope of the present disclosure. Those skilled in the art may recognize that illustrative embodiments may be variously modified without departing from a claim and a spirit and a scope of its equivalent.

Accordingly, the present disclosure includes all other replacements, modifications and changes belonging to the following claim.

What is claimed is:

1. A method of encoding an immersive video, the method comprising:
  performing pruning for input images;
  generating an atlas by packing a plurality of patches generated by the pruning; and
  generating a cropped atlas from the atlas,
  wherein the cropped atlas is generated by removing from the atlas, a background region in which none of the patches are packed,
  wherein the cropped atlas is encoded instead of the atlas,
  wherein metadata for the cropped atlas is further encoded as well as the cropped atlas, and
  wherein the metadata comprises information representing whether the cropped atlas is encoded instead of the atlas.

2. The method according to claim 1, wherein in response that the information is encoded to indicate that the cropped atlas is encoded instead of the atlas, the metadata further comprises position information of the cropped atlas in the atlas and size information of the cropped atlas.

3. The method according to claim 2, wherein the position information comprises horizontal position information representing a position of a left boundary of the cropped atlas in the atlas and vertical position information representing a position of a top boundary of the cropped atlas in the atlas.

4. The method according to claim 2, wherein the size information includes width information of the cropped atlas and height information of the cropped atlas.

5. The method according to claim 1, wherein whether to generate the cropped atlas is determined based on whether object-based coding is applied, and
  wherein in response to the object-based coding being applied, only the patches derived from a first object are packed into the atlas while patches derived from objects other than the first object are excluded.

6. The method according to claim 1, wherein based on at least one of a size of the background region in the atlas or an attribute of an object from which the patches are derived, whether to generate the cropped atlas is determined.

7. A method of decoding an immersive video, the method comprising:
  decoding an object map and either an atlas or a cropped atlas from a bitstream; and
  synthesizing a view image for a predetermined object based on the object map and either the atlas or the cropped atlas,
  wherein the atlas is divided into a data region and a background region, the data region being composed of a plurality of patches, the background region being a region in which none of patches are packed,
  wherein the cropped atlas comprises only the data region excluding the background region,
  wherein metadata for the cropped atlas is further decoded from the bitstream, and wherein the metadata comprises information representing whether the cropped atlas is decoded instead of the atlas.

8. The method according to claim 7, wherein in response that the information indicates that the cropped atlas is decoded instead of the atlas, the metadata further comprises position information of the cropped atlas in the atlas and size information of the cropped atlas.

9. The method according to claim 8, wherein the position information comprises horizontal position information representing a position of a left boundary of the cropped atlas in the atlas in an original size and vertical position information representing a position of a top boundary of the cropped atlas in the atlas in the original size.

10. The method according to claim 8, wherein the size information includes width information of the cropped atlas and height information of the cropped atlas.

11. The method according to claim 7, wherein in response to object-based coding being applied, encoding the cropped atlas is decoded instead of the atlas, and wherein in response to the object-based coding being applied, only patches derived from a first object are present in the atlas while patches derived from objects other than the first object are excluded.

* * * * *